(12) United States Patent
Chu

(10) Patent No.: US 6,499,570 B2
(45) Date of Patent: Dec. 31, 2002

(54) SHOCK-ABSORBING DEVICE

(76) Inventor: Yu-Hsueh Chu, No. 15, Lane 93, Ho Chiang St., Taipei (TW)

( * ) Notice: Subject to any disclaimer, the term of this patent is extended or adjusted under 35 U.S.C. 154(b) by 0 days.

(21) Appl. No.: 09/811,470

(22) Filed: Mar. 20, 2001

(65) Prior Publication Data
US 2002/0011387 A1 Jan. 31, 2002

(30) Foreign Application Priority Data
Jul. 19, 2000 (TW) ........................................ 89114412 A

(51) Int. Cl.$^7$ ................................................ B60G 11/14
(52) U.S. Cl. ........................ 188/129; 267/34; 267/226; 267/249
(58) Field of Search ................................. 267/226, 249, 267/256, 136, 34, 153; 188/129

(56) References Cited

U.S. PATENT DOCUMENTS

| | | | | |
|---|---|---|---|---|
| 2,934,332 A | * | 4/1960 | Mercier | ...................... 267/226 |
| 3,111,201 A | * | 11/1963 | Bliven et al. | ................ 267/226 |
| 3,923,292 A | * | 12/1975 | Madden, Jr. | .................. 267/34 |
| 4,010,940 A | * | 3/1977 | Freyler | ........................ 267/153 |
| 5,102,109 A | * | 4/1992 | Schnetz | ....................... 267/226 |
| 5,720,474 A | * | 2/1998 | Sugiyama | .................... 267/249 |

* cited by examiner

Primary Examiner—Matthew C. Graham
(74) Attorney, Agent, or Firm—Rosenberg, Klein & Lee

(57) ABSTRACT

A shock-absorbing device includes an airtight cylindrical casing; at least one compressible springy ball arranged in the cylindrical casing; a main piston mounted in the cylindrical casing above the at least one compressible springy ball and reciprocated to compress the at least one compressible springy ball, the main piston having a piston rod extended out of the cylindrical casing; a damping substance flowing in the cylindrical casing; and a plurality of main piston valves respectively installed in said main piston for enabling the damping substance to flow between an upper chamber in the cylindrical casing above the main piston and a lower chamber in the cylindrical casing below the main piston.

18 Claims, 18 Drawing Sheets

SHOCK-ABSORBING DEVICE

BACKGROUND OF THE INVENTION

The present invention relates to shock-absorbing devices and, more particularly, to such a shock-absorbing device, which comprises a plurality of compressible springy balls of rubber. Plastics or silicon rubber material connected in series or parallel in a cylindrical casing to absorb or lessen the pressure.

Various shock-absorbing devices have been disclosed for use in bicycles, vessels, aircrafts, trains, cars, motorcycles, engineering machinery, industrial equipment, building construction equipment and etc. These conventional shock-absorbing devices commonly use shock-absorbing springs, shock absorbing elastomer, and hydraulic or pneumatic shock absorbing cylinders to absorb or lessen the pressure. However, these conventional shock-absorbing devices are still not satisfactory in function because of the following drawbacks:

a. Elastic fatigue, metal aging, and breaking problems tend to occur quickly with use;
b. Fluid or air leakage may occur, affecting the shock absorbing performance;
c. Attenuation of damping effect tends to occur;
d. Breakdown tends to occur upon an overload;
e. Bulking and heavy;
f. Limited buffering stroke;
g. Difficult to be standardized;
h. Load bearing and stroke range adjustment not applicable; and
i. High cost.

Further, in building and bridge construction, lead-core rubber bearing cushions, laminated rubber bearing cushions, rubber bearing cushions of high damping coefficient are commonly used to lessen static force, dynamic force and earthquake shockwaves. However, these devices do not return to their former shape quickly after deformed by an external force.

SUMMARY OF THE INVENTION

The present invention has been accomplished to provide a shock-absorbing device, which eliminates the aforesaid drawbacks. According to one aspect of the present invention, the shock-absorbing device is developed subject to Boyle's law: the product of the pressure and the specific volume of a gas at constant temperature is constant.

According to another aspect of the present invention, the shock-absorbing device comprises an airtight cylindrical casing; at least one compressible springy ball arranged in the cylindrical casing; a main piston mounted in the cylindrical casing above the at least one compressible springy ball and reciprocated to compress the at least one compressible springy ball, the main piston having a piston rod extended out of the cylindrical casing; a damping substance flowing in the cylindrical casing; and a plurality of main piston valves respectively installed in said main piston for enabling the damping substance to flow between an upper chamber in the cylindrical casing above the main piston and a lower chamber in the cylindrical casing below the main piston. According to another aspect of the present invention, the compressible springy balls can be arranged in series, or alternatively in parallel in the cylindrical casing. According to still another aspect of the present invention, the compressible springy balls are made of elastic plastic or rubber material, or silicon rubber.

DETAILED DESCRIPTION OF THE PREFERRED EMBODIMENT

Figure 1:
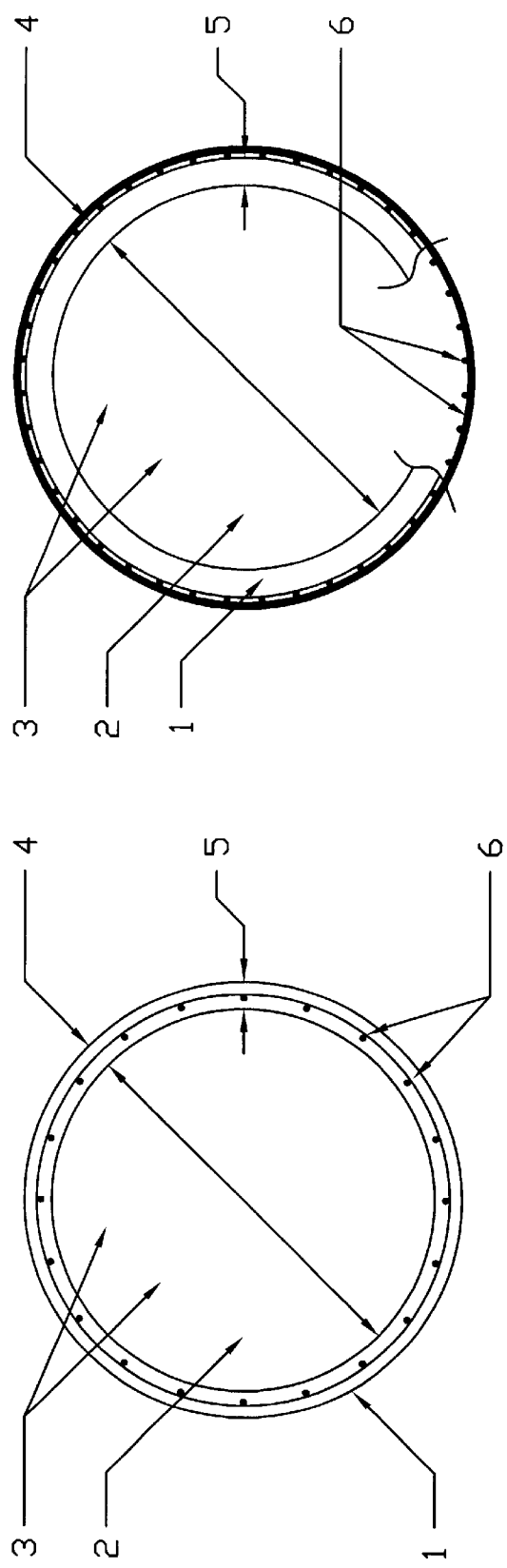
FIG. 1 illustrates the structure of a compressible springy ball according to the present invention.

Referring to FIG. 1, a compressible springy ball 11 is shown filled up a gas 3, providing an internal pressure 2. In order to reinforce the pressure strength of the springy ball 11 and protect the springy ball 11 against expansion or permanent deformation due to heat or external pressure, the springy ball 11 is internally or externally covered with a fiber or metal-wire reinforcing covering layer 6. The diameter 4, the intensity of internal pressure 2, the type of material (plastics, rubber, or silicon rubber) 1 used, the thickness of the ball wall 5, and the use of the fiber or metal-wire reinforcing covering layer 6 of the springy ball 11 are determined subject to the specifications of the shock-absorbing device to fit different requirement, so as to well protect the facility and the persons.

Figure 2:
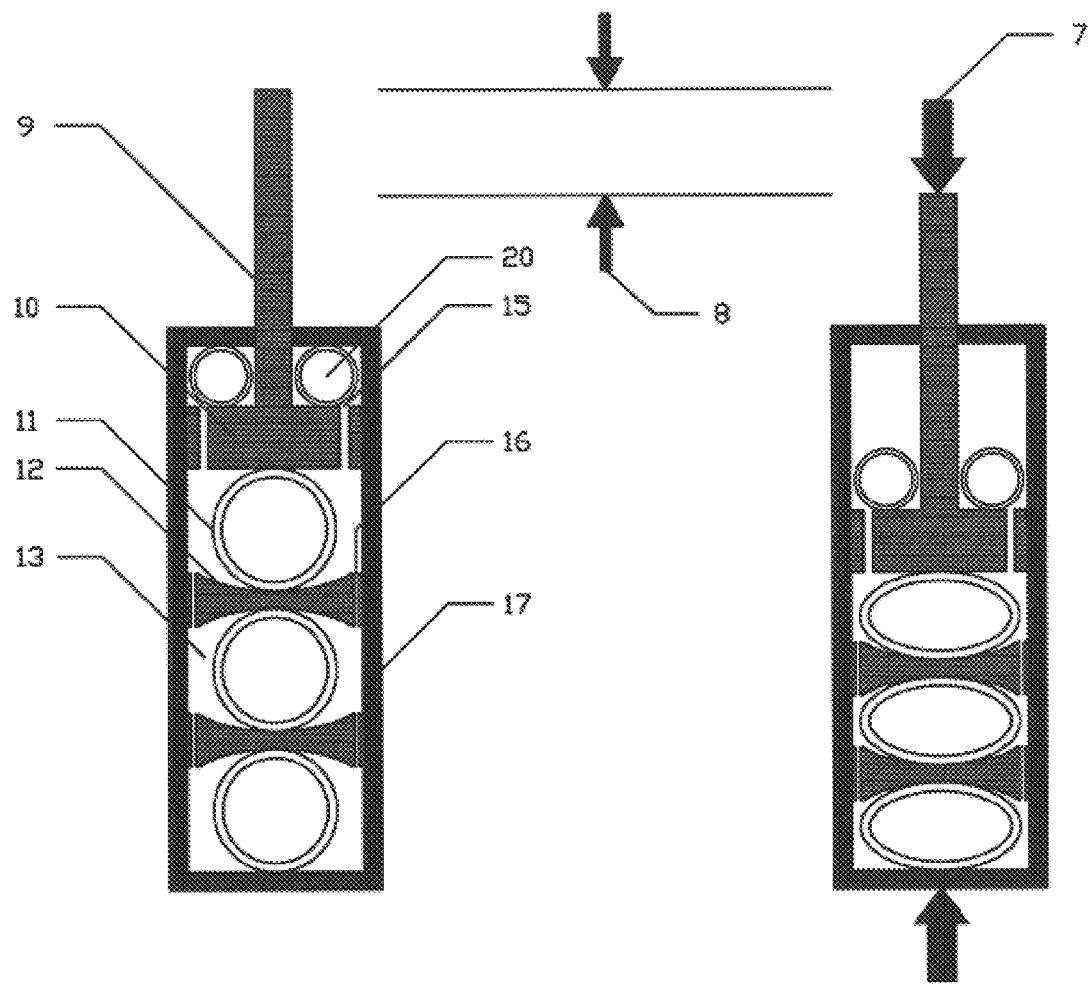
FIG. 2 illustrates the status before and after compression of a shock-absorbing device according to the present invention.

Referring to FIG. 2, a shock-absorbing device is shown comprising a cylindrical casing 17, a series of springy balls 11 mounted in the cylindrical casing 17, a main piston 10 reciprocated in the cylindrical casing 17 and supported on the series of springy balls 11, a piston rod fixedly connected to the main piston 10 and extended out of the cylindrical casing 17, a plurality of main piston valves 15 respectively installed in the main piston 10, and a damping substance 13 filled in the lower air chamber of the cylindrical casing 17 below the main piston 10. According to this embodiment, the damping substance 13 is a gas. When applying a force 7 to the piston rod 9 to produce a stroke 8, the main piston 10 is moved forwards to compress the spring balls 11, causing the gaseous damping substance 13 to flow from the lower air chamber of the cylindrical casing 17 below the main piston 10 to the upper air chamber of the cylindrical casing 17 above the main piston 10 through the main piston valves 15 (the main piston 10 divides the internal airtight space of the cylindrical casing 17 into an upper air chamber above the main piston 10 and a lower air chamber below the main piston 10). Because the air passage of each main piston valve 15 is narrow, when the gaseous damping substance 13 passes through the main piston valves 15, a damping resistance is produced. Furthermore, auxiliary pistons 12 may be mounted in the cylindrical casing 17 to separate the springy balls 11 from one another. The auxiliary pistons 12 are respectively equipped with a plurality of auxiliary piston valves 16. When forcing the gaseous damping substance 13 to flow upwardly through the auxiliary piston valves 16 of each auxiliary piston 12, a respective damping resistance is produced to buffer the pressured at the piston rod 9. The auxiliary pistons 12 also produce a friction resistance when reciprocated in the cylindrical casing 17. When the pressure applied to the piston rod 9 is reduced, the springy balls 11 gradually return to their former shape to force the pistons 10 and 12 upwards. When the applied pressure disappeared, the active force of the gaseous damping substance 13 immediately forces the main piston 10 back to the upper limit position. Further, in order to prevent a sudden impact between the main piston 10 and the top sidewall of the cylindrical casing 17 upon upstroke of the piston rod 9, two auxiliary springy balls 20 are bilaterally mounted in the upper air chamber of the cylindrical casing 17 above the main piston 10. The structure of the auxiliary springy balls 20 is similar to the springy balls 11 with the exception of the diameter. The auxiliary springy balls 20 are relatively smaller than the springy balls 11.

Figure 3:
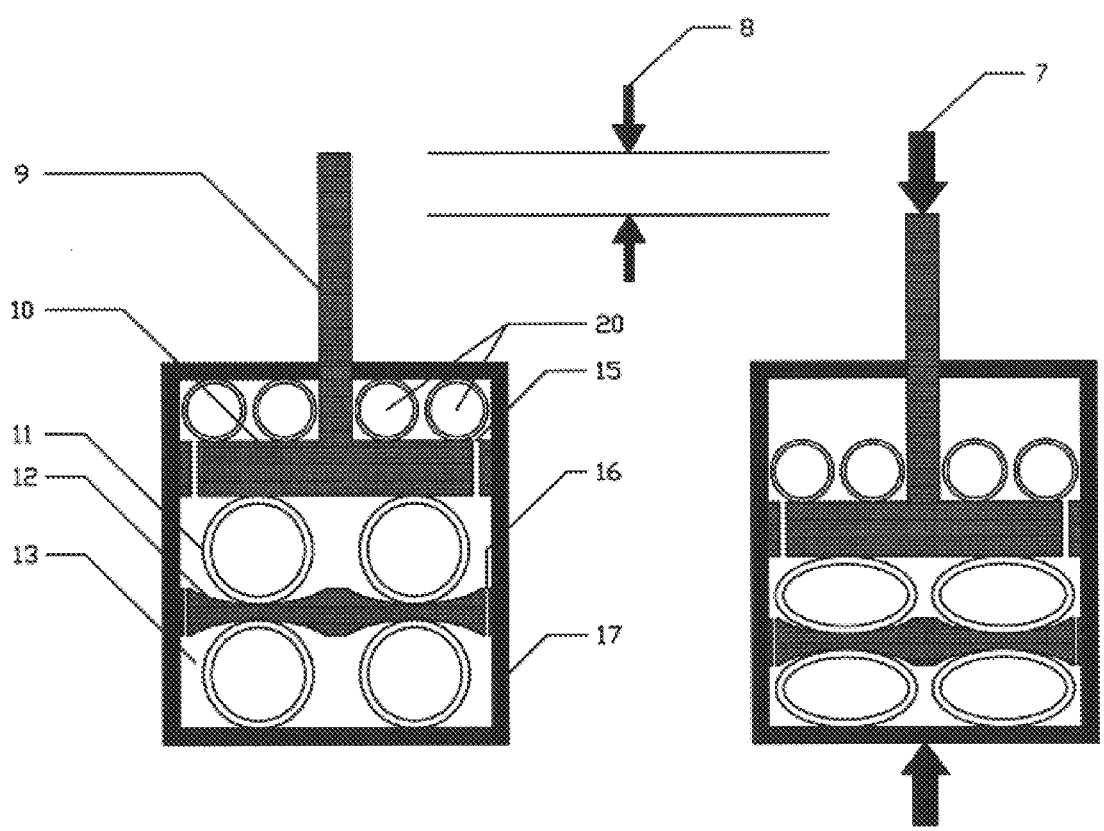
FIG. 3 illustrates the status before and after compression of an alternate form of the shock-absorbing device according to the present invention.

FIG. 3 shows an alternate form of the present invention. According to this alternate form, the springy balls 20 and the auxiliary springy balls 20 are arranged in pair, i.e., pairs of springy balls 20 and auxiliary springy balls 20 are respectively arranged in parallel in the cylindrical casing 17. In either of the embodiment shown in FIG. 2 or the embodiment shown in FIG. 3, the ratio between the combined diameter of the springy balls 11 or 20 in transverse direction and the inner diameter of the cylindrical casing 17 is smaller than 1 but greater than $2/\pi$. This limitation prevents the springy balls 11 or 20 from squeezing the peripheral wall of the cylindrical casing 17 when the springy balls 11 or 20 are compressed and temporarily deformed.

Figure 4:
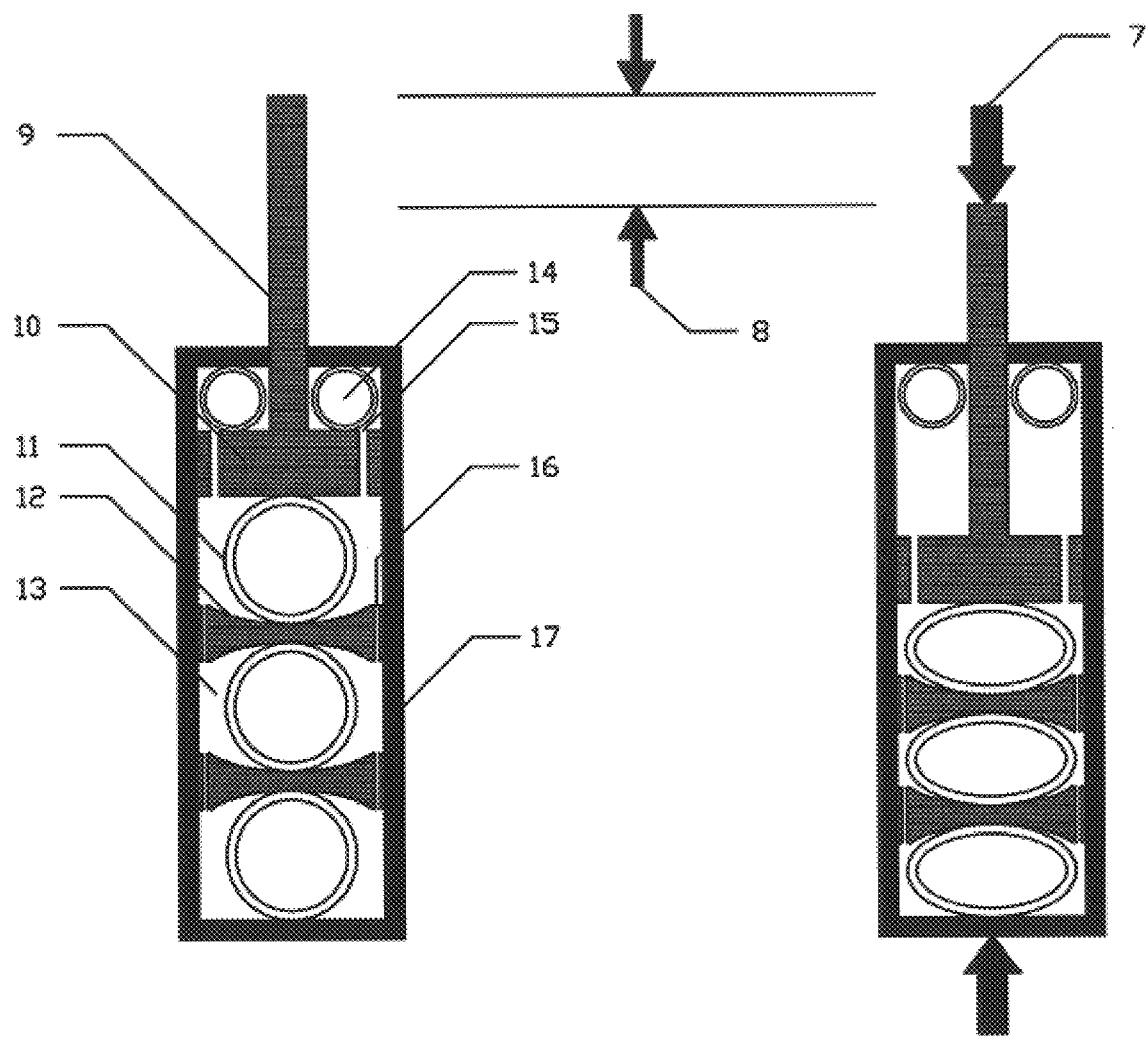
FIG. 4 illustrates the status before and after compression of another alternate form of the shock-absorbing device according to the present invention.
Figure 5:
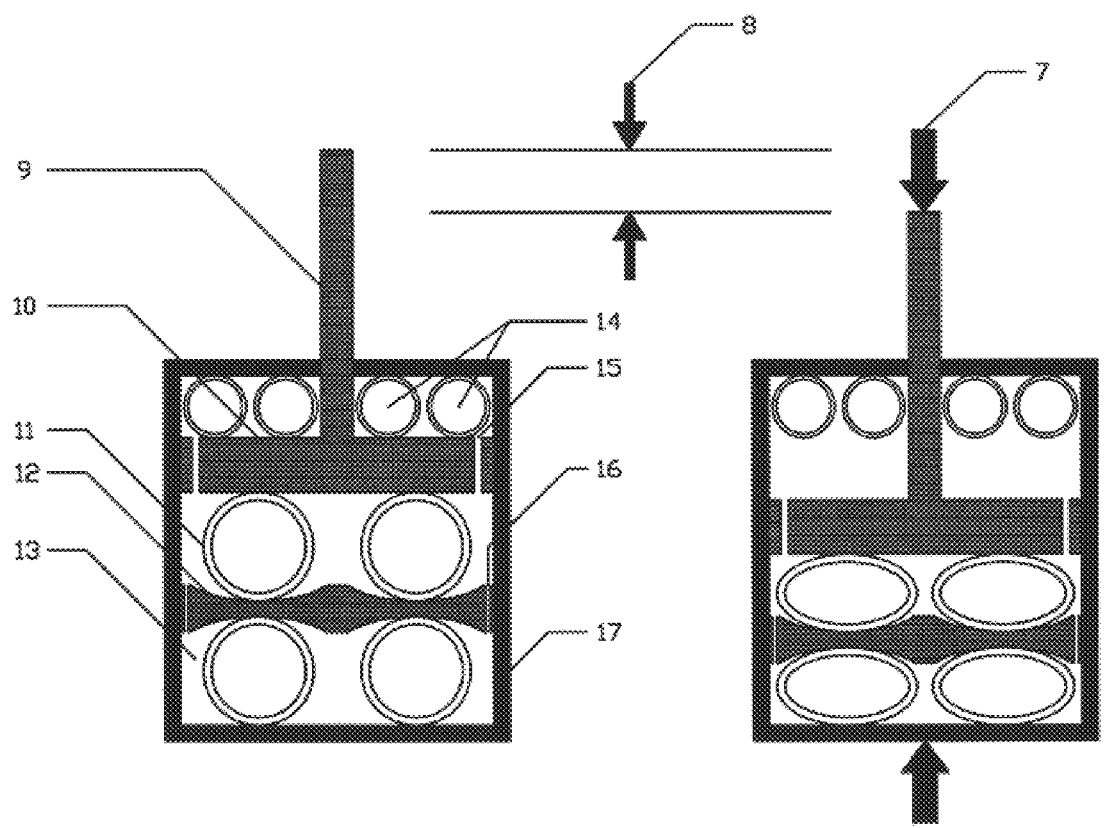
FIG. 5 illustrates the status before and after compression of still another alternate form of the shock-absorbing device according to the present invention.

Referring to FIGS. 4 and 5, the damping substance 13 can be obtained from a degas fluid. Because the viscosity of the degas fluid is higher than gas, it produces a higher damping resistance to achieve a better shock absorbing effect. The fluid damping substance is not compressible. When applying a pressure to the piston rod 7 to lower the main piston 10, the springy balls 11 are compressed. At this time, the volume of the part of the piston rod 9 in the cylindrical casing 17 substitutes for the volume of the springy balls 11 contracted. Because the cylindrical casing 17 is an airtight structure, a vacuum negative pressure or positive pressure may be produced in the cylindrical casing 17 to affect the shock absorbing effect. In order to eliminate this problem, small springy balls 14 are installed in the cylindrical casing 17 in the space between the main piston 10 and the top sidewall of the cylindrical casing 17, i.e., in the upper air chamber of the cylindrical casing 17. The small springy balls 14 work reversed to the spring balls 11, so as to eliminate the formation of negative or positive pressure in the cylindrical casing 17, preventing a leakage of the fluid damping substance 13.

Figure 6:
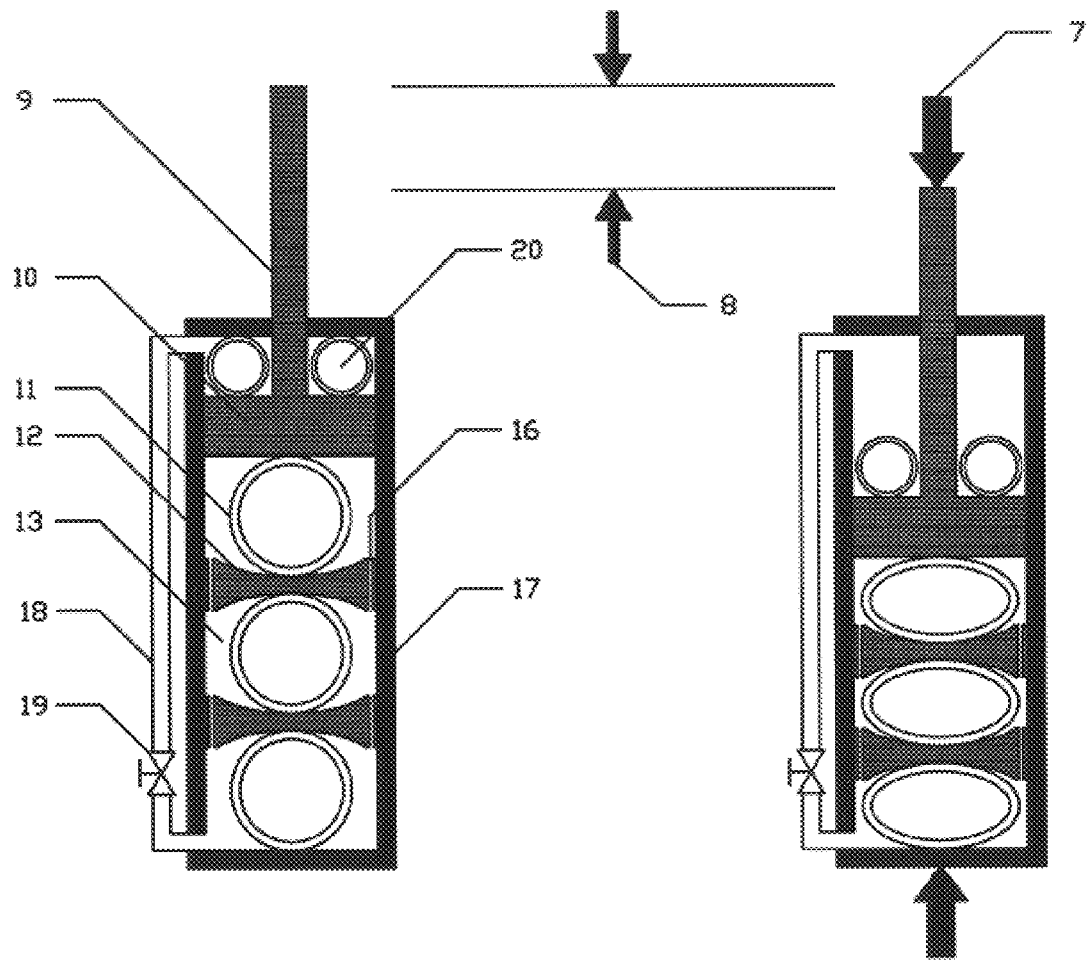
FIG. 6 illustrates the status before and after compression of still another alternate form of the shock-absorbing device according to the present invention.
Figure 7:
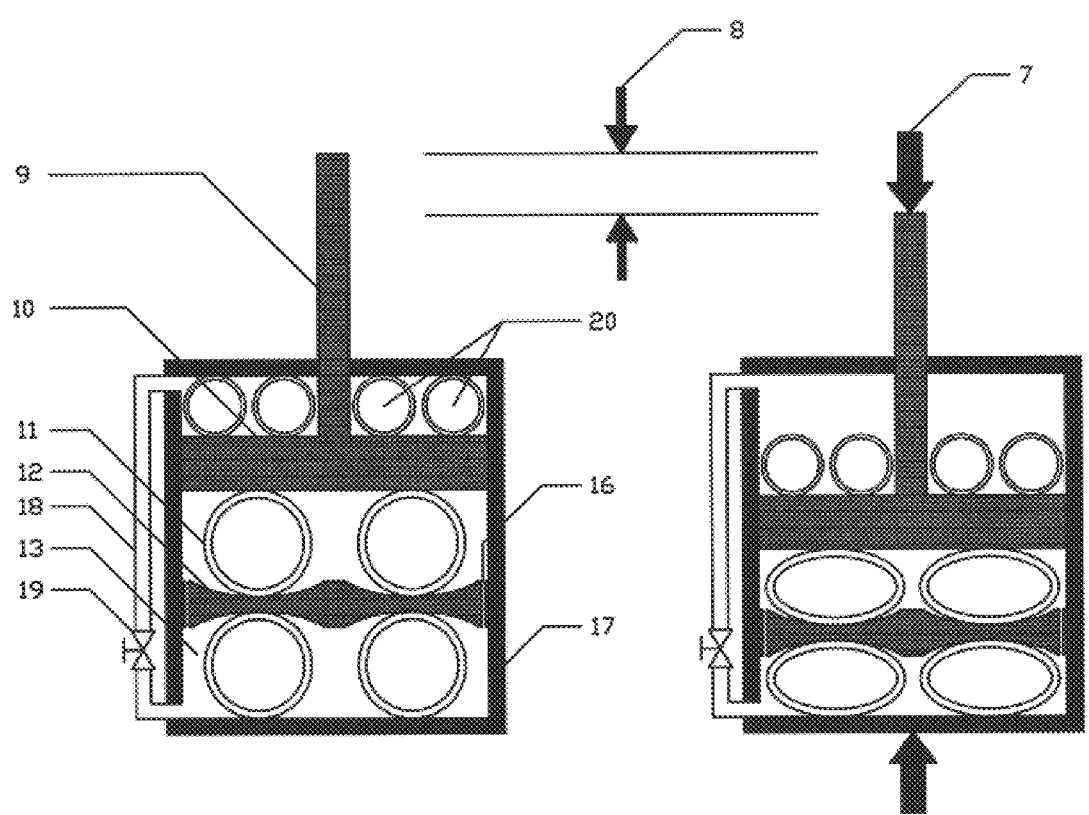
FIG. 7 illustrates the status before and after compression of still another alternate form of the shock-absorbing device according to the present invention.

FIGS. 6 and 7 show another two alternate forms of the present invention. According to these two alternate forms, the cylindrical casing 17 comprises an external guide tube 18 connected between top and bottom sides thereof and equipped with a throttle valve 19, and the aforesaid main piston valves 15 are eliminated from the main piston 10. When applying a pressure 7 to the piston rod 9 to lower the main piston 10, the gaseous damping substance 13 is forced to flow from the lower air chamber in the cylindrical casing 17 through the auxiliary piston valves 16 of the auxiliary pistons 12 to the external guide tube 18 and then the upper air chamber in the cylindrical casing 17 above the main piston 10. When passing through the throttle valve 19 in the external guide tube 18, the flow rate of the gaseous damping substance is regulated.

Figure 8:
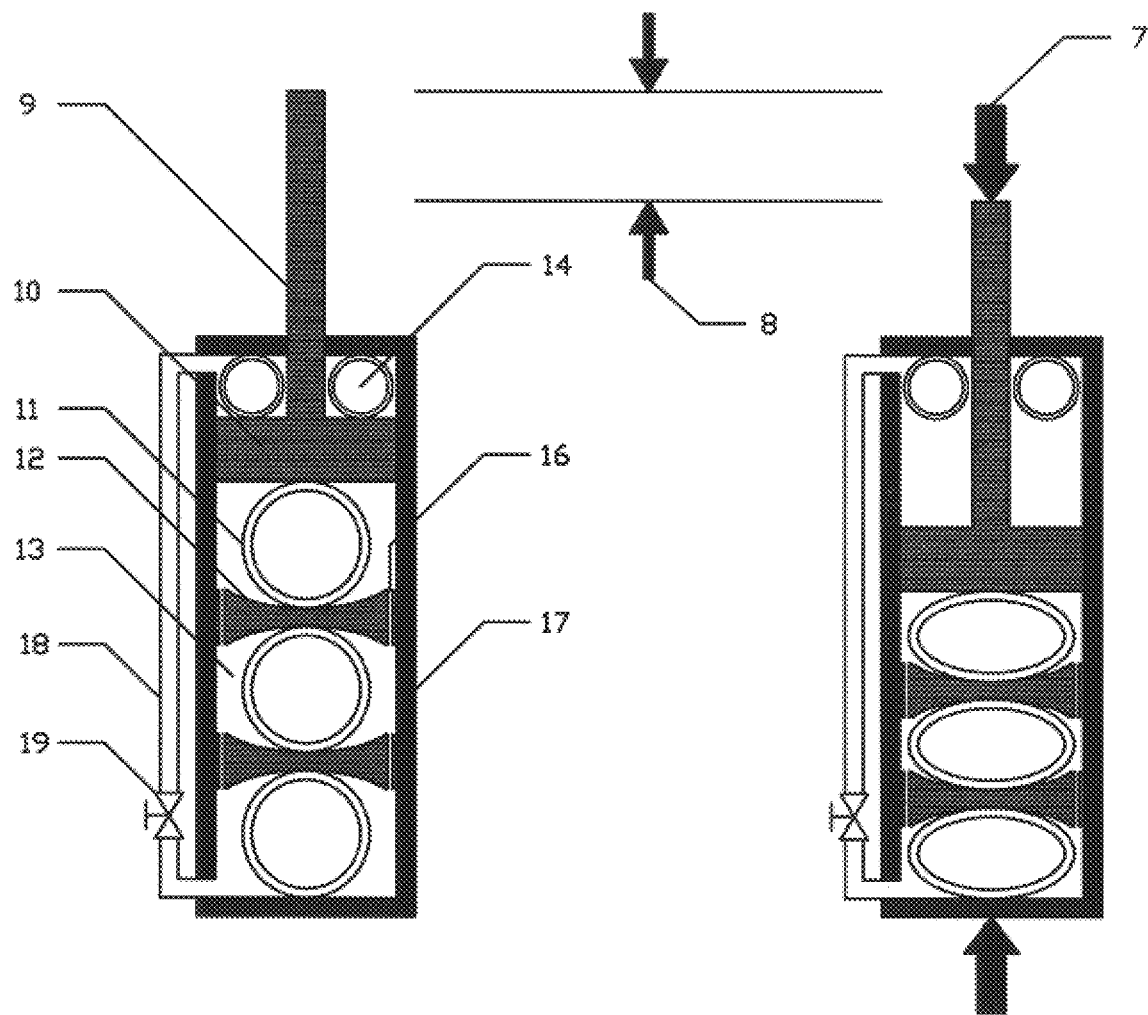
FIG. 8 illustrates the status before and after compression of still another alternate form of the shock-absorbing device according to the present invention.
Figure 9:
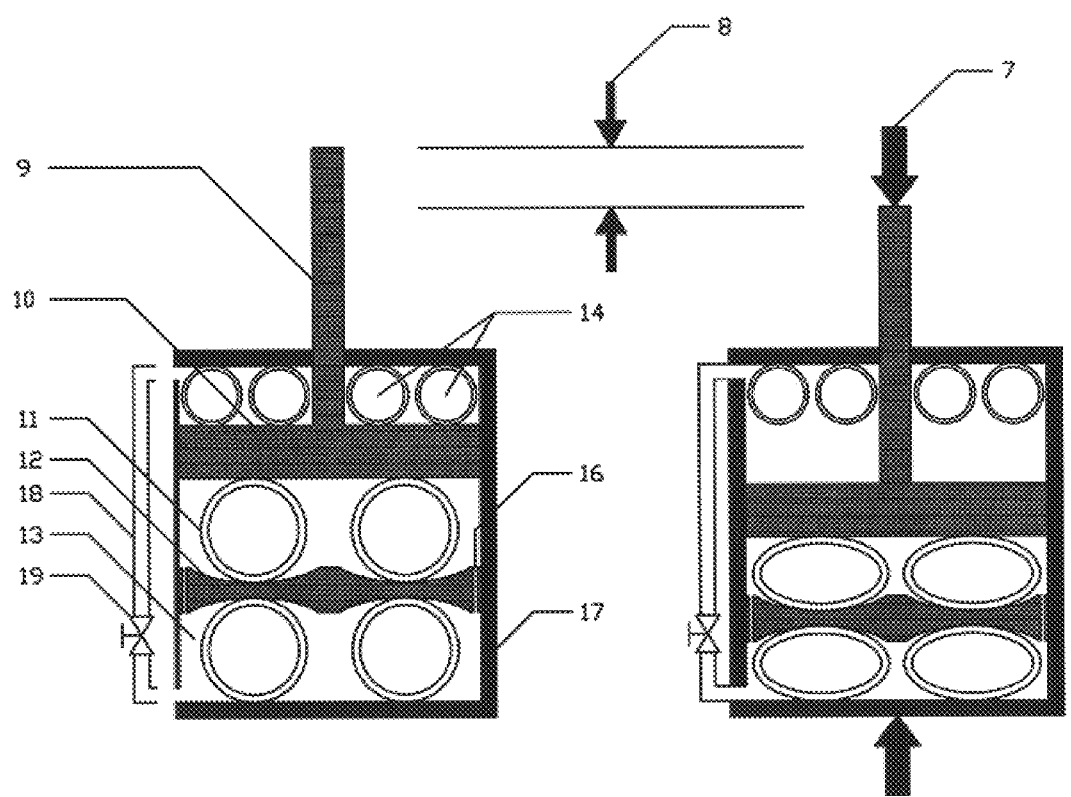
FIG. 9 illustrates the status before and after compression of still another alternate form of the shock-absorbing device according to the present invention.
Figure 10:
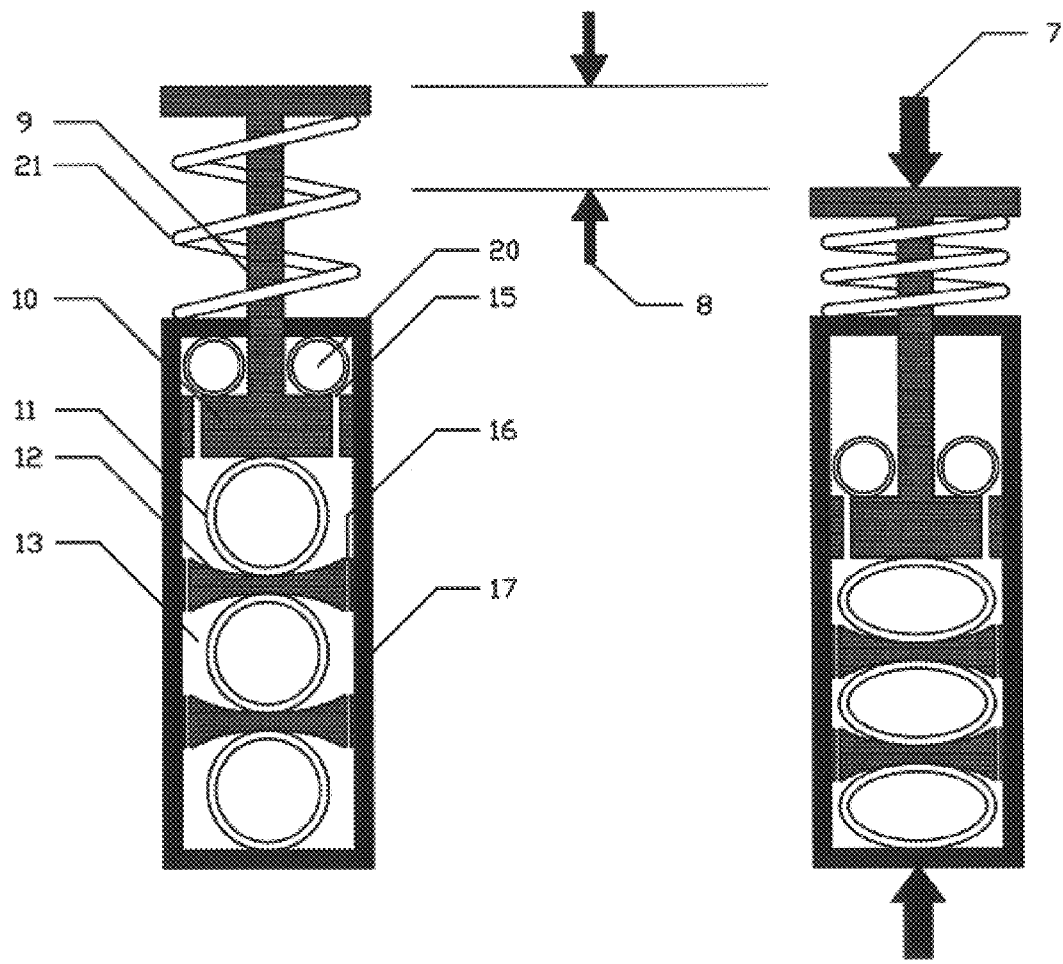
FIG. 10 illustrates the status before and after compression of the shock-absorbing device of FIG. 2 used with a shock absorbing spring according to the present invention.
Figure 11:
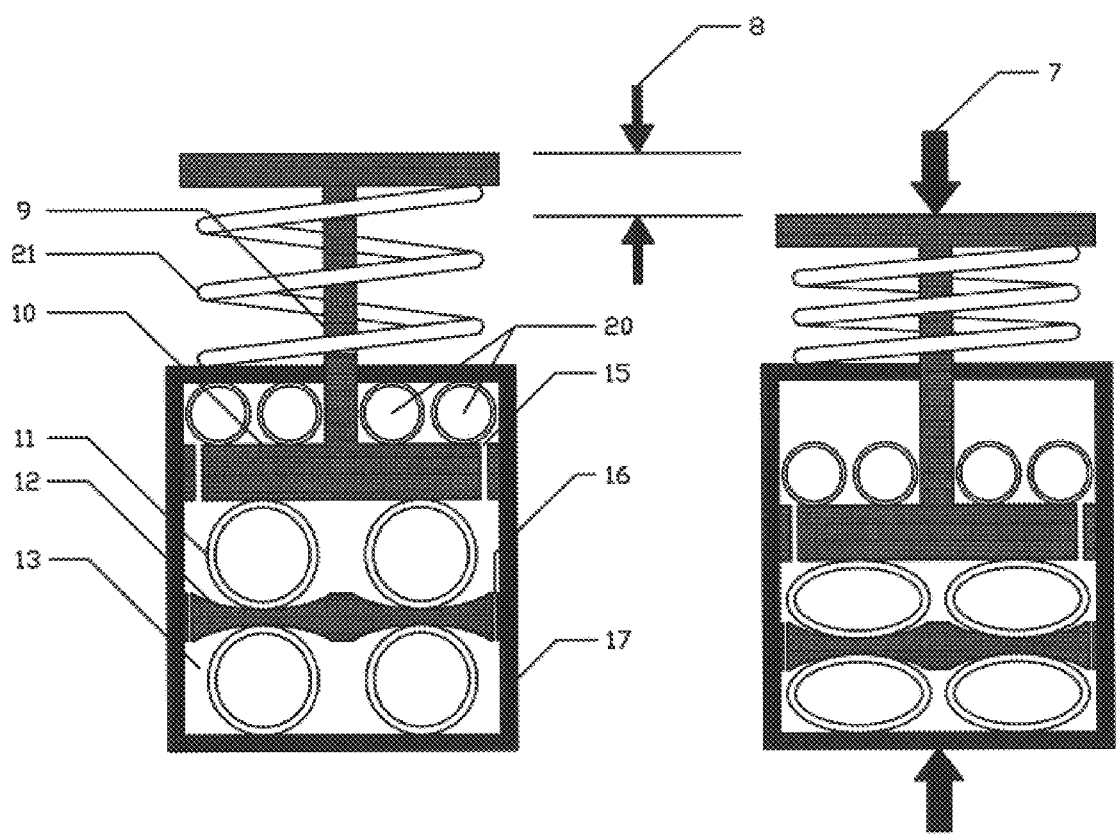
FIG. 11 illustrates the status before and after compression of the shock-absorbing device of FIG. 3 used with a shock absorbing spring according to the present invention.
Figure 12:
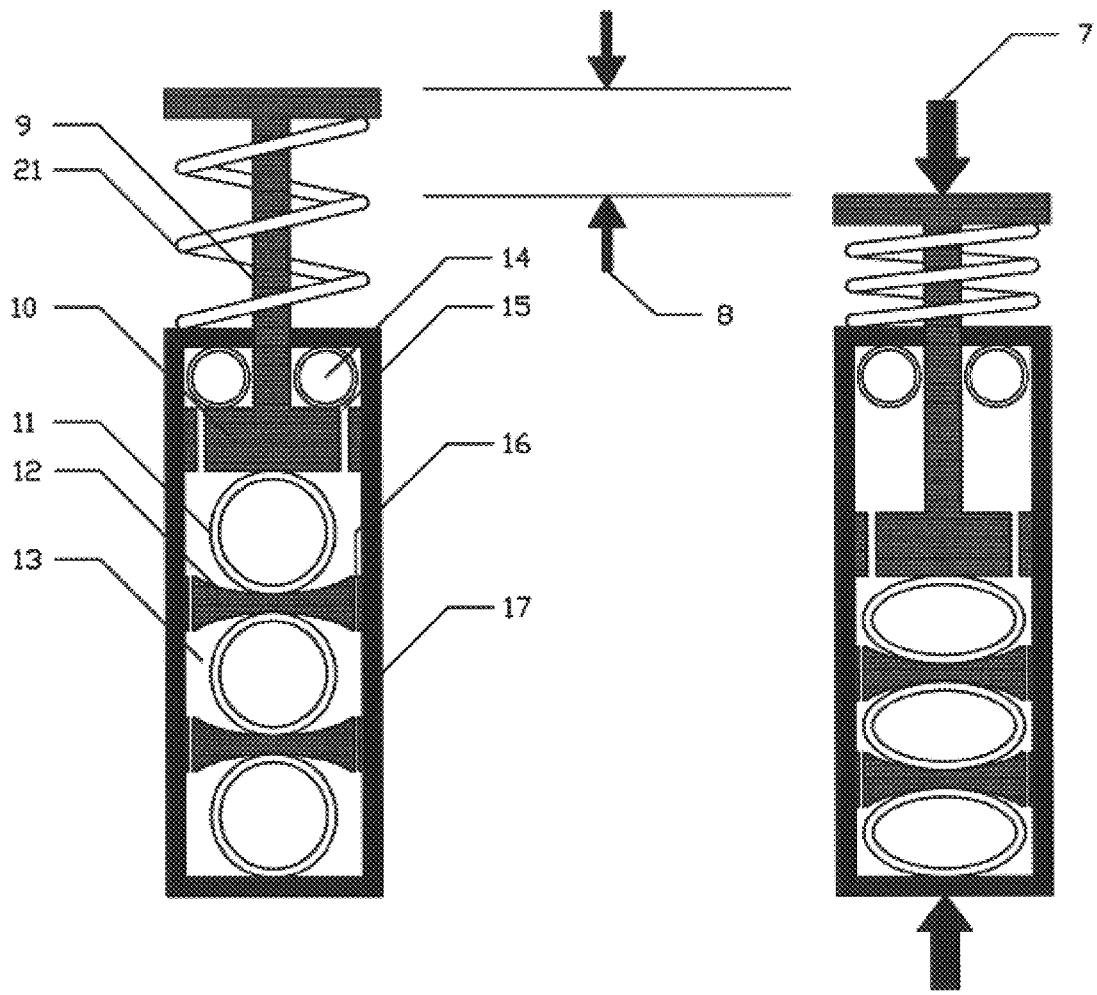
FIG. 12 illustrates the status before and after compression of the shock-absorbing device of FIG. 4 used with a shock absorbing spring according to the present invention.
Figure 13:
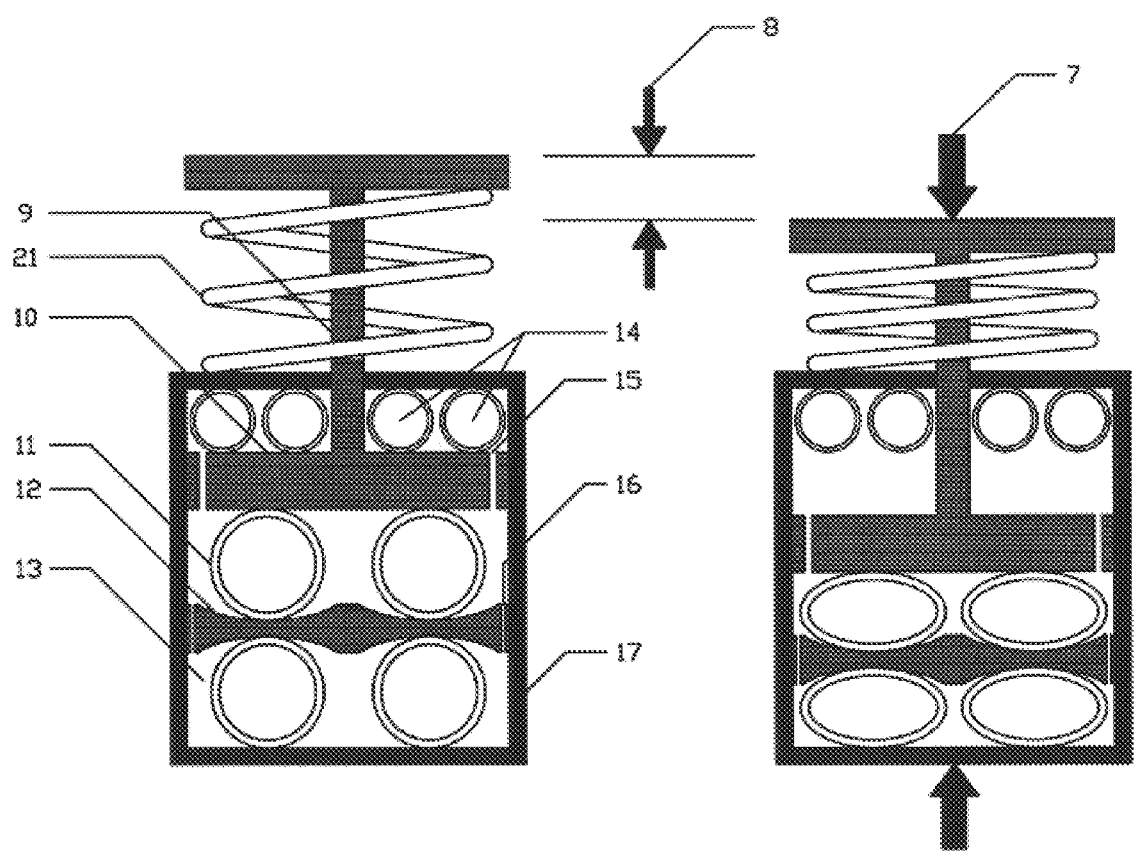
FIG. 13 illustrates the status before and after compression of the shock-absorbing device of FIG. 5 used with a shock absorbing spring according to the present invention.
Figure 14:
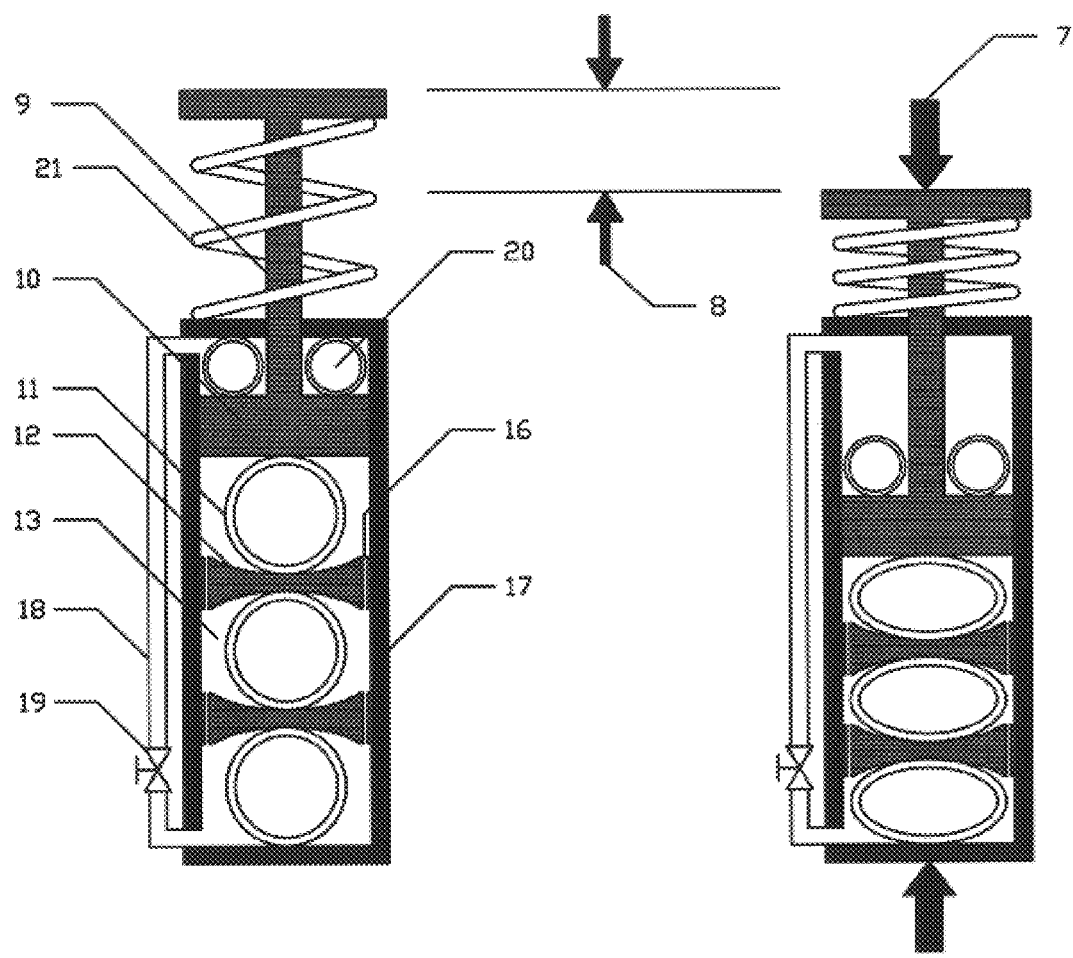
FIG. 14 illustrates the status before and after compression of the shock-absorbing device of FIG. 6 used with a shock absorbing spring according to the present invention.
Figure 15:
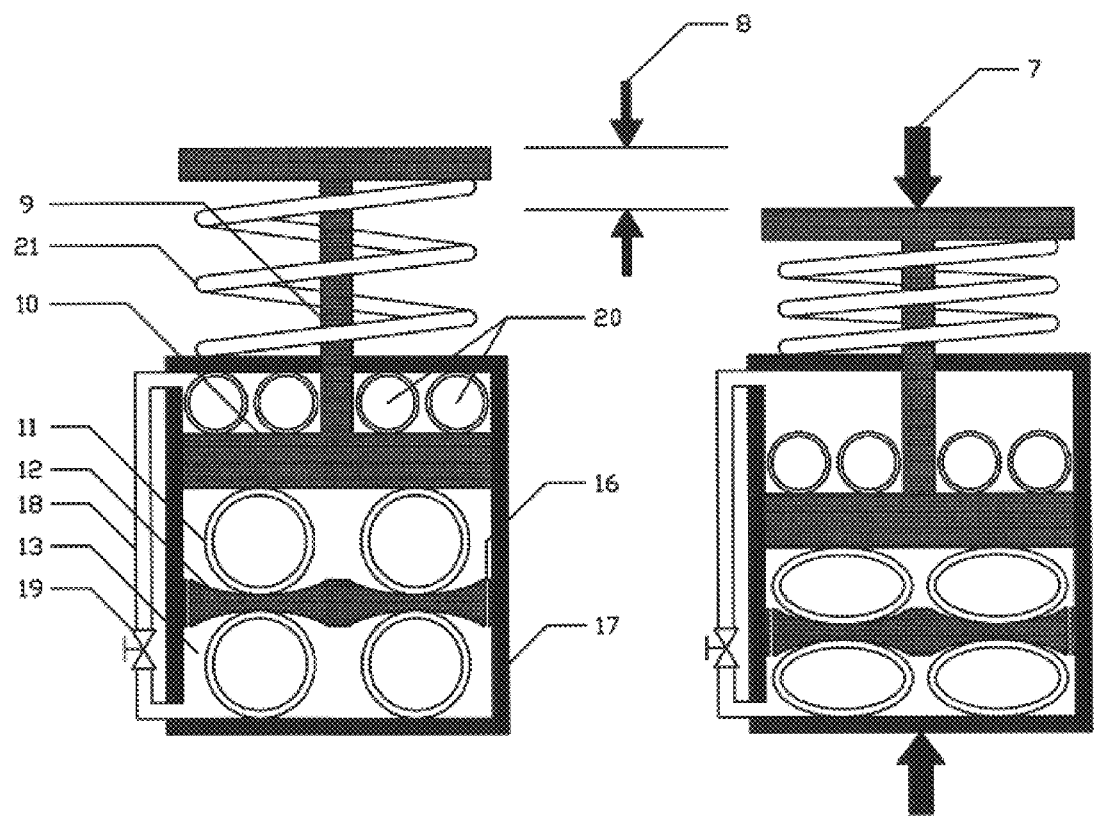
FIG. 15 illustrates the status before and after compression of the shock-absorbing device of FIG. 7 used with a shock absorbing spring according to the present invention.
Figure 16:
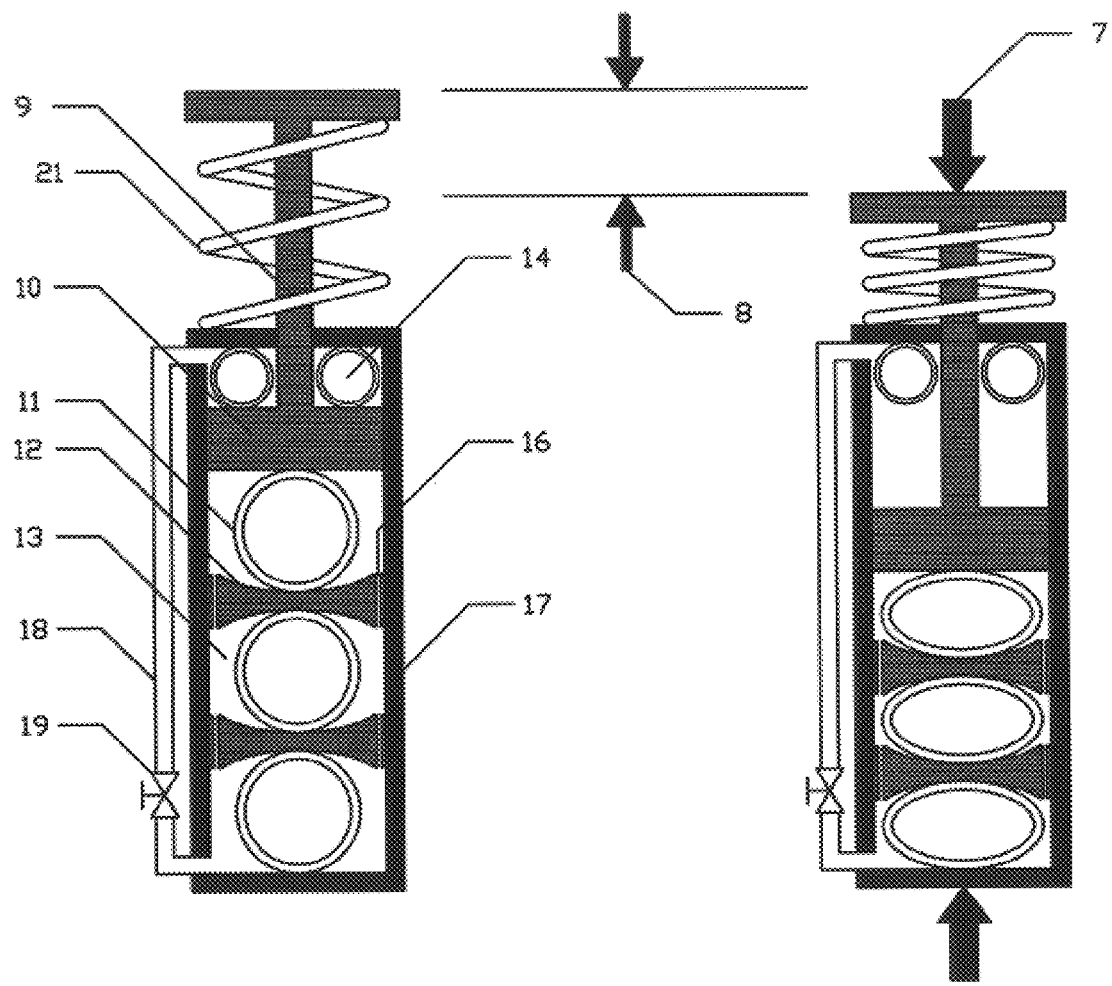
FIG. 16 illustrates the status before and after compression of the shock-absorbing device of FIG. 8 used with a shock absorbing spring according to the present invention.
Figure 17:
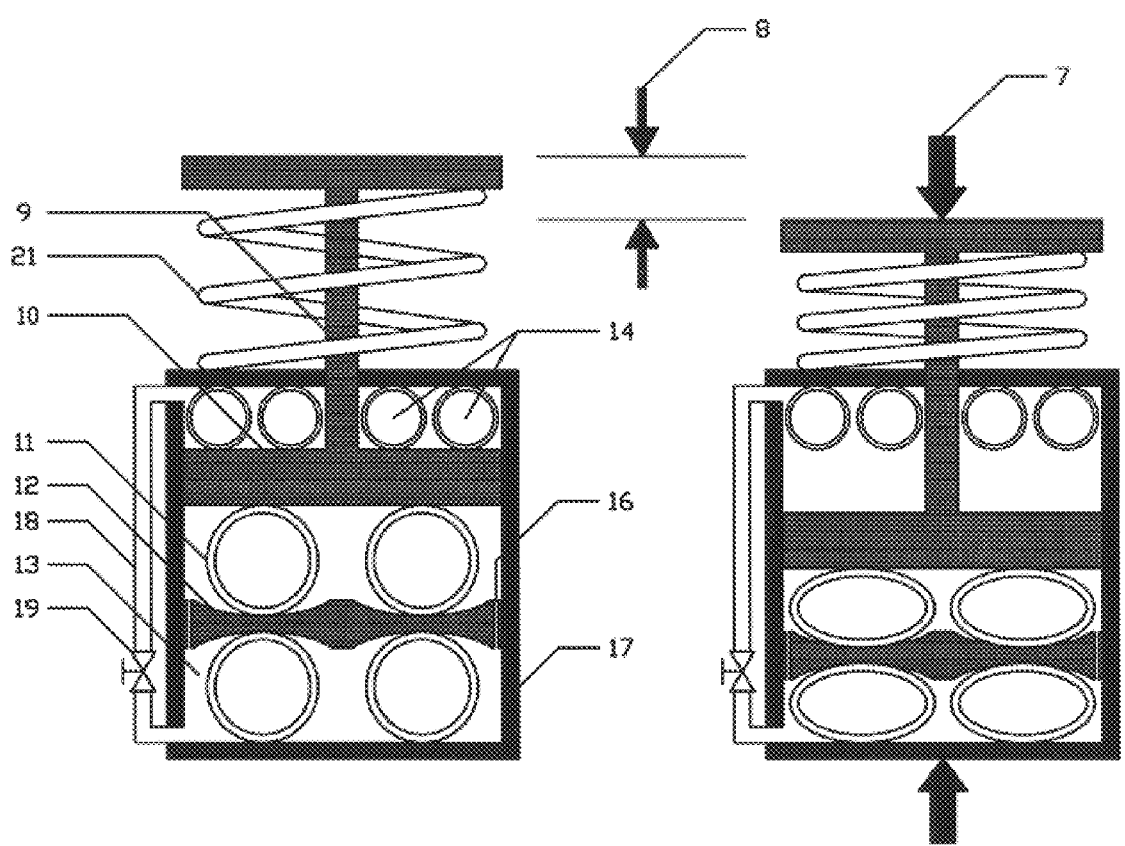
FIG. 17 illustrates the status before and after compression of the shock-absorbing device of FIG. 9 used with a shock absorbing spring according to the present invention.

FIGS. 8 and 9 show still another two alternate forms of the present invention. According to these two alternate forms, the damping substance 13 filled in the cylindrical casing 17 is a degas fluid damping substance. When applying a pressure 7 to the piston rod 9 to lower the main piston 10, the fluid damping substance 13 is forced to flow from the lower fluid chamber in the cylindrical casing 17 through the auxiliary piston valves 16 of the auxiliary pistons 12 to the external guide tube 18 and then the upper fluid chamber in the cylindrical casing 17 above the main piston 10. When passing through the throttle valve 19 in the external guide tube 18, the flow rate of the fluid damping substance is regulated.

Furthermore, the shock-absorbing device of the present invention can be used with conventional shock absorbing springs, shock absorbing elastomer, hydraulic or pneumatic shock absorbing cylinders.

FIGS. from 10 through 17 show different alternate forms of the present invention used with a shock absorbing spring.

Figure 18:
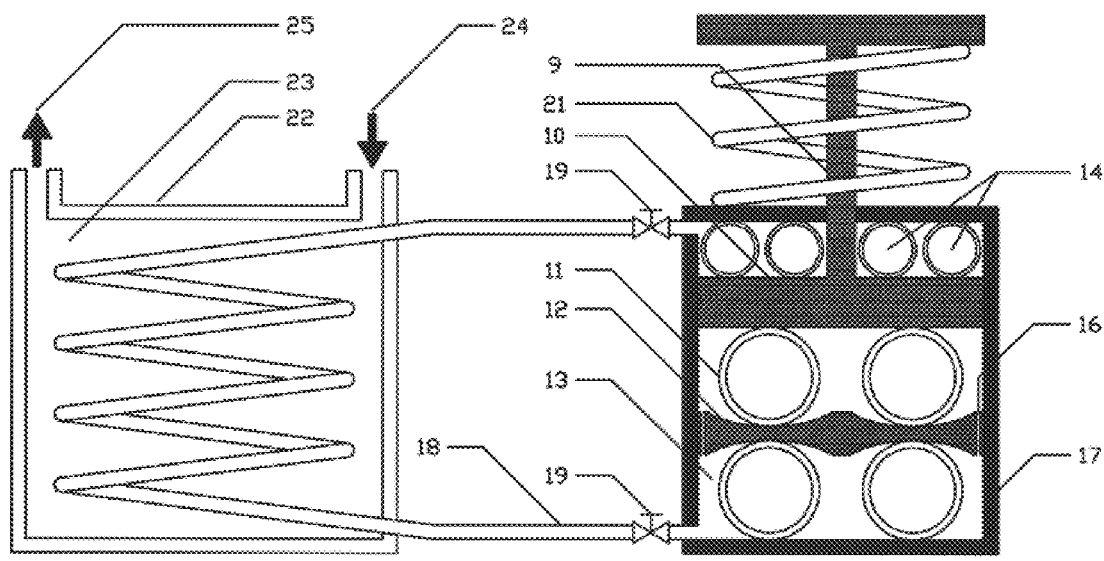
FIG. 18 illustrates the design of the shock-absorbing device of FIG. 17 used with a heat exchanger according to the present invention

Referring to FIG. 18, the external guide tube 18 can be made in the form of a coil tube to increase its length within a limited installation space. According to this embodiment, two throttle valves 19 are respectively installed in two ends of the external guide tube 18 to regulate the flow rate of the damping substance 13. Furthermore, a heat exchanger 22 is provided and using cooling water 23 to carry heat from the damping substance 13 when the damping substance 13 flows through the external guide tube 18. This embodiment keeps the temperature of the shock-absorbing device within the set working temperature range.

It is to be understood that the drawings are designed for purposes of illustration only, and are not intended for use as a definition of the limits and scope of the invention disclosed.

What the invention claimed is:

1. A shock-absorbing device comprising:
   a cylindrical casing defining an airtight space;
   at least a pair of compressible springy balls arranged in said cylindrical casing;
   a main piston mounted in said cylindrical casing above said at least a pair of compressible springy balls and dividing the airtight space of said cylindrical casing into an upper chamber and a lower chamber, said main piston being reciprocated to compress said at least a pair of compressible springy balls within said lower chamber, said main piston having a piston rod extending out of said cylindrical casing;
   a damping substance flowing in said cylindrical casing;
   a plurality of main piston valves respectively installed in said main piston for enabling said damping substance to flow between said upper chamber above said main piston and said lower chamber below said main piston;
   at lest one auxiliary piston position between said at least a pair of compressible springy balls; and,
   at least one auxiliary piston valve disposed in said at least one auxiliary piston for flow of said damping substance therethrough.

2. The shock-absorbing device of claim 1 comprising a plurality of springy balls disposed in series inside said cylindrical casing.

3. The shock-absorbing device of claim 1 comprising a plurality of sets of springy balls disposed in series, each set of springy balls including a plurality of springy balls disposed in parallel.

4. The shock-absorbing device of claim 1 comprising a plurality of springy balls, said plurality of springy balls being respectively desposed in series and in parallel inside said cylindrical casing.

5. The shock-absorbing device of claim 1, wherein said damping substance is a gaseous damping substance.

6. The shock-absorbing device of claim 1, wherein said damping substance is a degas fluid damping substance.

7. The shock-absorbing device of claim 1 further comprising a plurality of auxiliary springy balls mounted in said cylindrical casing in the upper chamber above said main piston, said auxiliary spring balls being smaller than the springy balls in the chamber inside said cylindrical casing below said main piston.

8. The shock-absorbing device of claim 1 further comprising a shock absorbing spring coupled between said piston rod and said cylindrical casing.

9. A shock-absorbing device comprising:
   a cylindrical casing defining an airtight space;
   at least one compressible springy ball arranged in said cylindrical casing;
   a main piston mounted in said cylindrical casing above said at least one compressible springy ball and dividing said airtight space of said cylindrical casing into an upper chamber and a lower chamber and reciprocated to compress said at least one compressible springy ball, said main piston having a piston rod extended out of said cylindrical casing;
   a damping substance filled in said cylindrical casing;
   a guide tube connected between top and bottom sides of said cylindrical casing and disposed outside said cylindrical casing and adapted to guide said damping substance between said upper chamber above said main piston and said lower chamber below said main piston; and
   a plurality of main piston valves respectively installed in said main piston for enabling said damping substance to flow between said upper chamber above said main piston and said lower chamber below said main piston through said guide tube.

10. The shock-absorbing device of claim 9, wherein said at least one springy ball includes a plurality of springy balls connected in series inside said cylindrical casing.

11. The shock-absorbing device of claim 10 further comprising at least one auxiliary piston mounted in said cylindrical casing to separate said springy balls from one another.

12. The shock-absorbing device of claim 9, wherein said at least one springy ball includes at least one set of springy balls connected in parallel.

13. The shock-absorbing device of claim 9, wherein said damping substance is a gaseous damping substance.

14. The shock-absorbing device of claim 9, wherein said damping substance is a degas fluid damping substance.

15. The shock-absorbing device of claim 9 further comprising a plurality of auxiliary springy balls mounted in said cylindrical casing in the chamber above said main piston, said auxiliary spring balls being relative smaller than the springy balls in the chamber inside said cylindrical casing below said main piston.

16. The shock-absorbing device of claim 5 further comprising a shock absorbing spring coupled between said piston rod and said cylindrical casing.

17. The shock-absorbing device of claim 9, wherein said at least one springy ball includes a plurality of springy balls respectively connected in series and in parallel inside said cylindrical casing.

18. The shock-absorbing device of claim 9 further comprising a water-cooling heat exchanger adapted to remove heat from said damping substance when said damping substance flows through said guide tube.

* * * * *